United States Patent [19]

Marin

[11] 4,456,927
[45] Jun. 26, 1984

[54] VIDEO CIRCUITRY
[75] Inventor: Roger A. Marin, Portland, Oreg.
[73] Assignee: Vidicraft, Inc., Portland, Oreg.
[21] Appl. No.: 326,929
[22] Filed: Dec. 2, 1981
[51] Int. Cl.³ .......................................... H04N 9/535
[52] U.S. Cl. .................................. 358/153; 358/21 R; 358/27; 358/37
[58] Field of Search .................. 358/31, 153, 21 R, 39, 358/40, 37, 27

[56] References Cited
U.S. PATENT DOCUMENTS
4,185,299  1/1980  Harford ............................. 358/153.
4,365,266  12/1982  Lagoni .................................. 358/31

Primary Examiner—Michael A. Masinick
Attorney, Agent, or Firm—Klarquist, Sparkman, Campbell, Leigh, Whinston & Dellett

[57] ABSTRACT

A video processing circuit separates chrominance and luminance signals and processes the same separately from synchronizing information whereby the video signal may be reformed with a selected video level, selected color saturation, and selected chroma hue. The synchronizing information is not reprocessed, but is coupled through the circuit and the other video signal portions are adjusted relative thereto. An output circuit provides a stable output with very low distortion by including a negative feedback circuit having appreciable loop gain. A sync separator circuit also includes a feedback circuit for consistently detecting horizontal sync pulses approximately midrange.

10 Claims, 7 Drawing Figures

VIDEO CIRCUITRY

BACKGROUND OF THE INVENTION

The present invention relates to a video processing circuit for adjusting video luminance and chrominance levels as well as chroma hue, and particularly to such circuitry wherein synchronizing or timing information is accurately detected, and a stable video output is provided.

It is frequently desirable to adjust the various components of a color video signal relative to one another, to suit individual preference or to compensate for misadjustment of other circuitry. Thus, one may wish to adjust the video output from video camera equipment, or adjust the input or output of a video recorder to improve transmission or recording capabilities as well as for improving picture quality. Although adjustments are usually available on television receiving or tuning equipment, alteration of the video signal may be desired between a tuner and hard-to-reach television projection equipment.

Heretofore, video processing circuitry of this type has often been expensive and designed primarily for the professional user. Usually the synchronization information, i.e. the horizontal and vertical synchronizing pulses, color burst, etc. are reformed or regenerated, while the video luminance and chrominance information is separately adjustable. Time delays are usually associated with the reconstituted sync and proper blanking in the video signal may be somewhat clumsy.

In the concurrently filed application of James A. Karlock, a processing circuit is disclosed and claimed wherein synchronizing information is not reprocessed, but other video signal portions are adjusted relative thereto. It is important in such circuitry that the various portions be accurately synchronized and that a stable output for driving other equipment be provided.

SUMMARY OF THE INVENTION

In accordance with the present invention in a preferred embodiment thereof, a sync separating or sync detecting circuit is employed to provide information for synchronizing, clamping, and D.C. restoring various components of a video signal which are being selectively adjusted and recombined. The sync separating circuit employs positive feedback for avoiding misdetection due to vertical rate tilt and/or "sag" in the detected signal from one horizontal line to the next.

In a particular embodiment, such sync separating circuit comprises an RC coupling circuit driving the base of a sync detecting transistor from the emitter of a transistor. A positive feedback transistor is coupled from the output to the input of the sync detecting transistor.

In accordance with another feature of the present invention, an output stage capable of providing combined video information to a plurality of loads comprises a compound stage with an emitter follower output transistor connected in negative feedback fashion to the input transistor. Appreciable loop gain provides an output with very low distortion, e.g. for use with a color video signal.

It is accordingly an object of the present invention to provide an improved sync separating or detecting circuit.

It is a further object of the present invention to provide an improved sync separating circuit which is relatively noncomplex and inexpensive.

It is another object of the present invention to provide a video processing circuit with an output circuit exhibiting low distortion.

It is another object of the present invention to provide an improved and stable output stage for providing a video output at a predetermined level.

The subject matter which I regard as my invention is particularly pointed out and distinctly claimed in the concluding portion of this specification. The invention, however, both as to organization and method of operation, together with further advantages and objects thereof, may best be understood by reference to the following drawings wherein like reference characters refer to like elements.

DETAILED DESCRIPTION

Figures 1, 2:
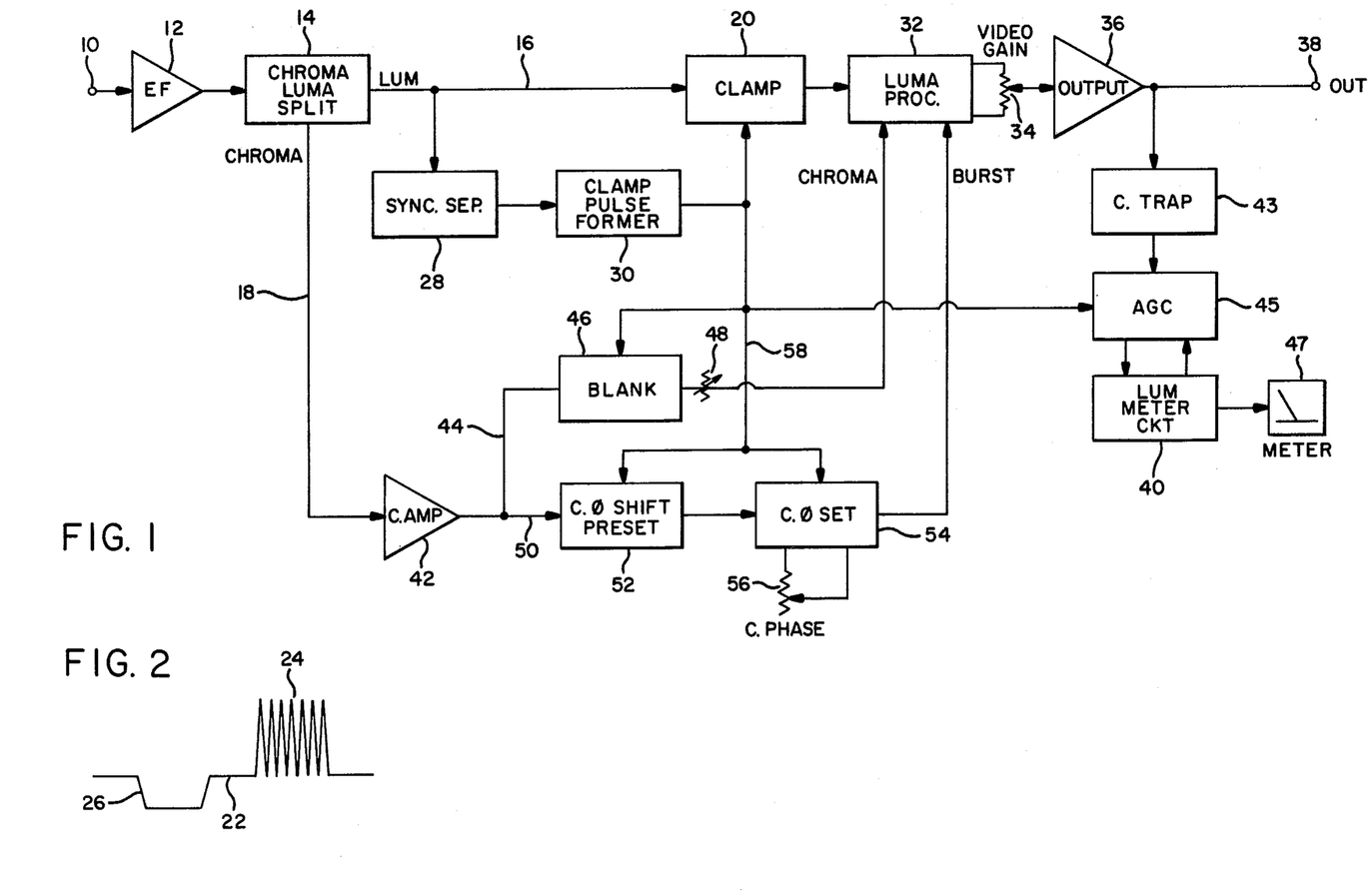
FIG. 1 is a block diagram of video processing circuitry according to the present invention.
FIG. 2 is a simplified representation of a video signal waveform.

Referring to the drawings and particularly to FIG. 1, illustrating an embodiment of a video processing circuit according to the present invention in block diagram form, a video input signal, e.g. a color television video signal, is received at terminal 10 and coupled via emitter follower stage 12 to chrominance-luminance separation circuit 14 providing a first or luminance output 16, and a second or chrominance output 18. The luminance output is coupled to clamp circuit 20 which clamps the video signal at this point to the "back porch" of the video horizontal blanking pulse, this level being indicated at 22 in FIG. 2 which illustrates the video luminance signal in simplified form including video information or luminance information 24, and horizontal sync pulse 26. For the purposes of the present application, the sync pulse will be considered negative going, and the video positive going.

The clamping signal for clamping circuit 20 is derived via sync separator circuit 28, also receiving the luminance output of circuit 14, the sync separator circuit driving a clamp pulse former 30 providing a "back porch" pulse to clamp circuit 20 as well as to other portions of the overall circuit. The output of clamp circuit 20 is provided to a luminance processor 32 wherein the luminance information is separated from the synchronizing information or horizontal sync pulse, the luminance information is amplified to a desired or selected degree, and the amplified luminance information is recombined with the synchronizing information. The circuit 32 is configured, as hereinafter more fully described, such that output potentiometer 34 is adjustable between one extreme where substantially only synchronizing information is provided, and an opposite extreme wherein the combination of synchronizing information and amplified luminance information is provided. In the instance of a specific embodiment, the last mentioned extreme corresponds to double the normal video level (assuming the input signal is correctly constituted) such that midrange of potentiometer 34 selects a normal video level with normal sync. It will be understood, however, that normal sync is available anywhere along potentiometer 34.

The movable tap of potentiometer 34 is applied to an output circuit 36 driving output terminal 38 where the output information may be utilized for the intended purpose. The output of amplifier 36 is also applied to a metering circuit 40 via intervening chrominance trap 43 and automatic gain control circuit 45. Metering circuit 40 operates meter 47 such that the operator of the apparatus may select a desired video luminance level. The meter 47 is suitably calibrated in percent, i.e. from 0% of maximum luminance to 100% of maximum luminance. The circuit meters luminance relative to sync tip level, with 100% luminance being designated as a predetermined multiple of sync tip level. This means that if a television camera or other apparatus coupled to input terminal 10 of the overall circuit were to view a brightly illuminated white wall or the like, meter 47 should read approximately 100%. If the meter reads some other value, then the luminance should be adjusted accordingly by means of potentiometer 34. In any case, the metering is relative to the synchronization signal, and the overall circuit is not only applicable to a given level input or a given level output but can be utilized with a wide variety of equipments.

The output 18 from chrominance-luminance separation circuit 14 is also applied to a chrominance amplifier 42 the output of which is provided on lead 44 to a blanking circuit 46. Circuit 46 receives the output of clamp pulse former 30 for the purpose of removing the color burst from the chrominance signal. The output of the blanking circuit 46 is provided to the luminance processor 32 via level control 48 such that the amplitude of the chroma portion of the overall signal output of the circuit can be adjusted. As will be appreciated by those skilled in the art, adjustment of the chroma will affect the color saturation of the final output video signal. The adjusted chrominance component from control 48 is applied to an input to the luminance amplifier portion of processor 32 after separation of the synchronizing information from the luminance signal and before recombination with such synchronizing information.

The output on lead 50 from chrominance amplifier 42 is applied to a first phase-shifting circuit 52, the output of which is applied to a second phase-shifting circuit 54 having a control 56. The phase-shifting circuits 52 and 54 receive an output on lead 58 from pulse former 30 for the purpose of enabling only the color burst portion of the chrominance signal from amplifier 42. The output of phase-shifting circuit 54 comprises the phase-shifted color burst and is combined in processor 32 with the synchronizing information that has been separated from the luminance signal and before the synchronizing information is recombined with the combination of the luminance and chrominance signal portions. The first phase-shifting circuit 52, as hereinafter more fully described, is adapted to shift the phase of the color burst in a first direction, while second phase-shifting circuit 54 is adapted to shift the phase of the color burst in the opposite direction such that for center position of control 56, there would be no net shift of the color burst. However, control 56 can then be employed for shifting the color burst in either direction from its initial phase at the output 50 of amplifier 42. As will be appreciated by those skilled in the art, the phase-shifting of the color burst has the effect of controlling the "hue" of the resulting color picture.

Referring further to FIGS. 3–7 illustrating the circuitry according to the present invention in greater detail, a video signal received on input terminal 10, e.g. from a video camera, recorder, or the like, is coupled via capacitor 60 and resistor 62 in series to the base of the emitter follower 12 which is also disposed at the midpoint of a voltage divider comprising resistors 64 and 66 connected between a positive voltage and ground. The emitter of emitter follower transistor 12 is connected via resistor 68 and capacitor 69 in series to one end of a tuned circuit 70 tuned to the color subcarrier frequency and adapted to operate as the chrominance-luminance separator. The luminance signal will pass through the parallel tuned circuit to output 16 connected to the emitter of common base transistor stage 72. The chrominance output on lead 18 is derived from the midpoint between the resistor 68-capacitor 69 combination, and is therefore taken substantially across the parallel tuned circuit. The chrominance output on lead 18 is coupled to the chrominance amplifier 42 which will be further considered in connection with FIG. 4. Common base connected transistor 72 drives emitter follower transistor 74, the emitter of which is connected in feed-back fashion via resistors 76 and 78 to the base of transistor 72 for supplying the base voltage thereof. A capacitor 80, shunted by resistor 82, is interposed between the midpoint of resistor 76, 78 and ground.

Figures 3, 5:
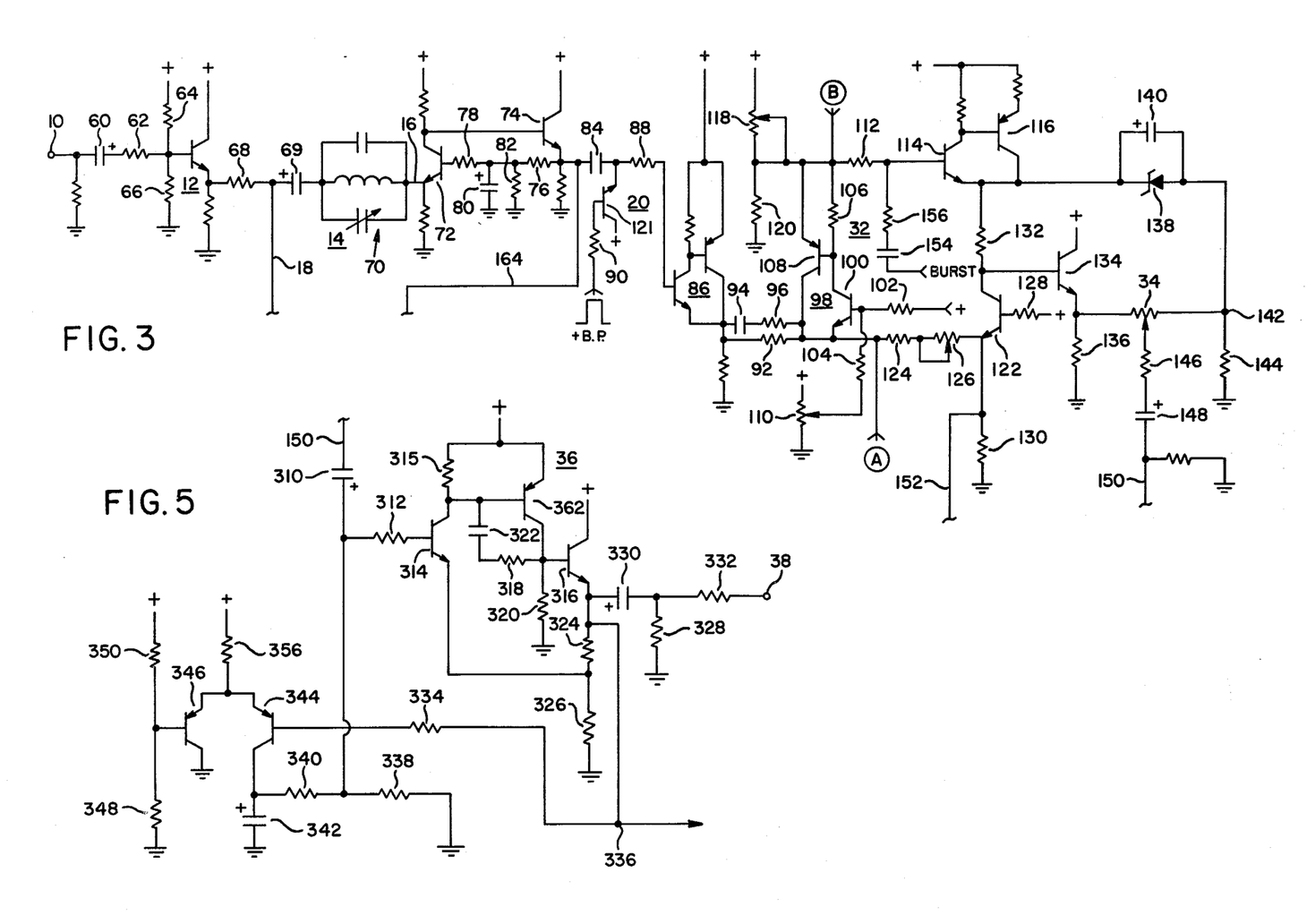
FIG. 3 is a circuit diagram of a first portion of the FIG. 1 video processing circuit, particularly illustrating chrominance-luminance separation and luminance processing.
FIG. 5 is a circuit diagram of an output amplifier according to the video processing circuit of FIG. 1.

Capacitor 84 couples the output of emitter follower transistor 74 to the base of compound transistor stage 86 by way of resistor 88. The junction between capacitor 84 and resistor 88 is connected to the emitter of clamping transistor 20 having its collector connected to a reference voltage, and having its base connected to clamping signal labeled +BP via resistor 90. The +BP input is a back porch clamp signal from pulse former 30 as hereinafter more fully described and clamps the back porch of the video signal at the emitter of transistor 20 at a predetermined level.

The output terminal of compound emitter follower stage 86 is coupled by way of resistor 92 shunted by capacitor 94 and resistor 96 in series to a sync separator stage 98, the latter comprising a transistor 100 having its emitter connected to the junction between resistors 92 and 96, its base connected to a reference voltage at the midpoint of a voltage divider comprising resistors 102 and 104, and its collector connected via resistor 106 to the emitter of transistor 108. The base of transistor 108 is connected to the collector of transistor 100, and the collector of transistor 108 is connected to the emitter of transistor 100. The stage operates as a common base stage, or more particularly as a unilateral conductor such that clipping takes place at the emitter of transistor 100. The voltage divider 102, 104 is connected between the same clamp reference voltage as at the collector of transistor 121, and a potentiometer 110, the latter being disposed between a positive voltage and ground. The potentiometer 110 is adapted to set the clipping level, but this clipping level is determined to be the back porch level of the video signal and, as a consequence, the synchronizing information comprising horizontal sync pulses is clipped at the emitter of transistor 100. However, the output of the circuit 98 provides a current at such time thereby coupling the synchronizing information through resistor 112 to the base of transistor 114, the latter forming part of a compound emitter follower with transistor 116. A voltage divider comprising a potentiometer 118 in series with the resistor 120 is disposed between a positive voltage and ground, with the junction between the emitter of transistor 108 and resistor 106 being connected to the midpoint of the voltage divider. The potentiometer 118 can be employed for setting the relative amplitude of the synchronization information, i.e. for setting a sync level as delivered to the base of transistor 114.

The emitter of transistor 100 is further coupled to an amplifier comprising common base transistor 122 by way of resistor 124 and potentiometer 126. The base of transistor 122 is returned to the same reference level as the collector of transistor 20 via resistor 128, its emitter is returned to ground by way of resistor 130, and its collector is connected to the emitter of transistor 114 through resistor 132. The collector of transistor 122 is also connected to the base of an emitter follower transistor 134 having an emitter resistor 136, the latter forming part of means for recombining or adjusting the luminance signal with respect to the synchronizing information. The emitter of transistor 114 is coupled via zener diode 138 shunted by by-pass capacitor 140 to terminal 142 of the output recombining or adjusting means, terminal 142 being returned to ground through resistor 144. The recombining or adjusting means suitably comprises a potentiometer 34 having one terminal connected to the emitter of transistor 134 and the remaining terminal connected to the aforementioned terminal 142.

It will be seen that the output of the amplifier comprising transistor 122 will be delivered via transistor 134 to the left end of the potentiometer, in conjunction with the synchronizing information supplied from the emitter of transistor 114 via resistor 132. The opposite end of potentiometer will be supplied with only synchronizing information from the emitter of transistor 114 via voltage dropping zener diode 138. Let us assume the amplifier comprising transistor 122 provides an amplification of two as compared with the input coupled to the overall circuit. Then movement of the movable tap of potentiometer 34 adjusts between a double level of luminance signal and zero level of luminance signal. However, the same level of synchronizing information is provided at both ends of the potentiometer. Consequently, the potentiometer 34 is used for adjusting luminance level with respect to the level of synchronizing information. It is noted that the synchronizing information is not reformed or regenerated, but luminance is adjusted with respect thereto. The movable tap of potentiometer 34 is coupled through resistor 146 and capacitor 148 to lead 150 connecting to output stage 36 as will hereinafter be more fully described.

As also hereinafter more fully described, the chrominance information is adjusted and is coupled on lead 152 to the emitter of amplifier transistor 122, the latter forming a summing point. Therefore, the luminance level potentiometer 34 may be considered an overall video level adjustment, having chrominance information returned thereto. Also, the burst is coupled to the base of transistor 114 through capacitor 154 in series with resistor 156, after the burst is adjusted in phase as will be hereinafter more fully described. Thus, the color burst is combined with synchronizing information including the sync pulses as delivered at both ends of potentiometer 34.

Figure 4:
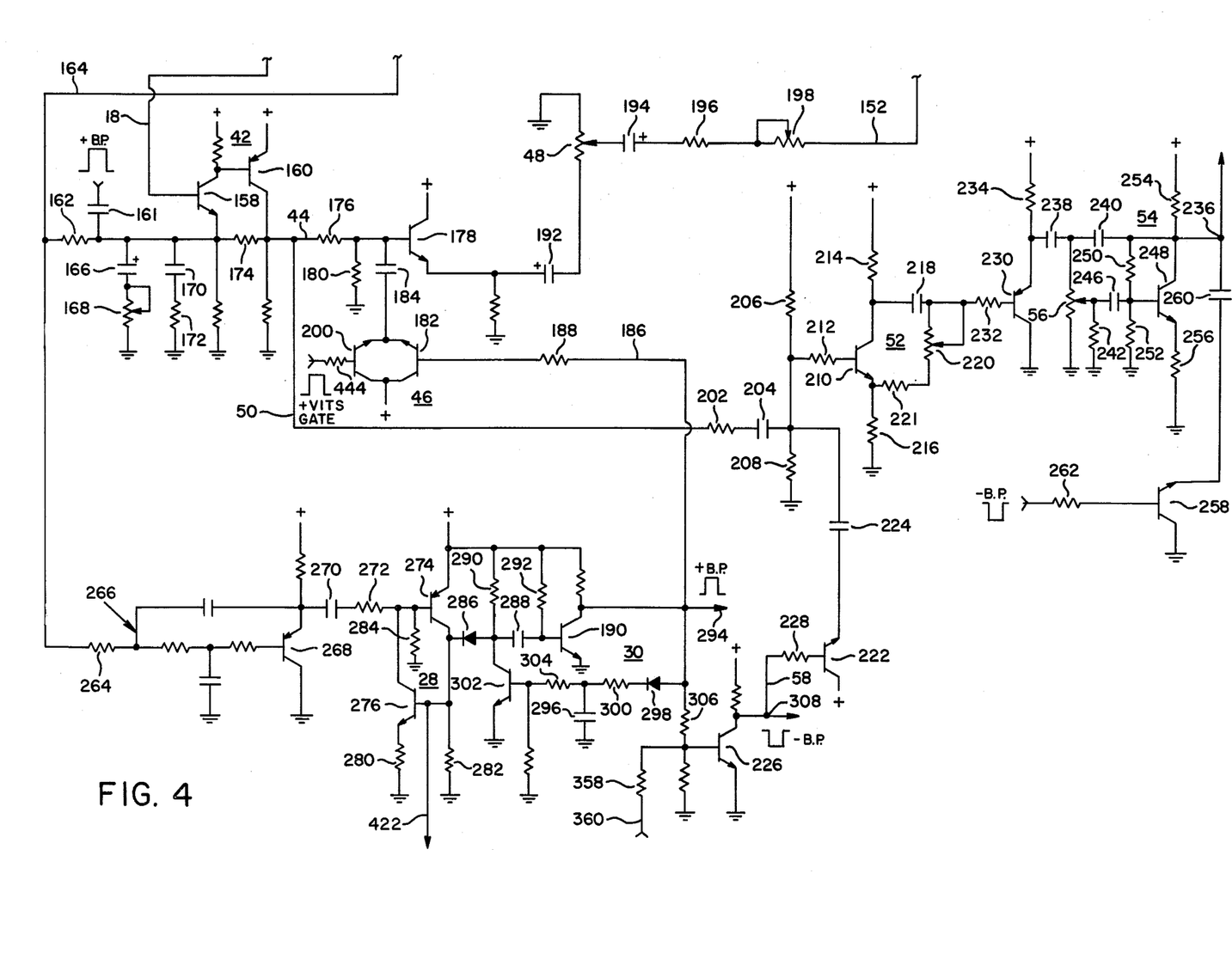
FIG. 4 is a circuit diagram of a further portion of the FIG. 1 processor, particularly illustrating the chrominance channel, sync separation and processing.

Referring to FIG. 4, the chrominance component of the video signal is coupled on lead 18 to chrominance amplifier 42 comprising transistor 158 and transistor 160 connected as a feedback pair where the gain is set by the feedback ratio. A back porch clamp is coupled to the emitter of transistor 158 through capacitor 161, and a resistor 162 couples the same emitter via lead 164 to the emitter of transistor 74 in FIG. 3. The latter connecton cancels some of the residual luminance that is found in the chrominance signal delivered from the chrominance-luminance separator circuit 14. The burst and chroma level at this point is adjusted by a circuit comprising capacitor 166 and variable resistor 168 disposed in series between the emitter of transistor 158 and ground. A high frequency compensation network comprising capacitor 170 in series with resistor 172 is also disposed between the emitter of transistor 158 and the ground. The emitter of transistor 158 is coupled to the collector of transistor 160 through resistor 174, and collector of transistor 160 is further connected via lead 44 to a blanking circuit 46, the purpose of which is to remove the color burst from the chroma information. Lead 44 is coupled via resistor 176 to the base of emitter follower transistor 178, the latter being returned to ground by base resistor 180. Clamping transistor 182, performing a blanking function, has its collector connected to a voltage reference level and its emitter coupled to the base of transistor 178 with capacitor 184. The base of transistor 182 receives a positive back porch clamp on lead 186 via resistor 188 from the collector of transistor 190 in pulse forming circuit 30. This back porch clamping pulse will effectively remove the color burst at the base of transistor 178 whereby the remaining chroma information at the emitter of transistor 178 is transmitted by way of capacitor 192 to one end of adjustment potentiometer 48 having its opposite terminal returned to ground. Potentiometer 48 is employed to set the chrominance level, i.e. the chrominance portion of the signal as amplified in the aforementioned amplifier 42, and the midpoint of the potentiometer is coupled through capacitor 194 in series with resistor 196 and variable resistor 198 to lead 152 for connection to the emitter of luminance amplifier transistor 122 in FIG. 3. In shunt with transistor 182 is a second transistor 200 comprising a VITS gate, the purpuse which will be hereinafter more fully described.

Lead 50 from chrominance amplifier 42 is coupled through resistor 202 and capacitor 204 in series to the midpoint of a voltage divider 206, 208 disposed between a positive voltage and ground, the midpoint of such voltage divider being further coupled to the base of transistor 210 in phase-shift stage 52 by way of resistor 212. Transistor 210 has its collector returned to a positive voltage through resistor 214, and its emitter returned to ground via resistor 216. A capacitor 218 connects the collector of transistor 210 to a first end of potentiometer 220, while a resistor 221 is interposed between the emitter of transistor 210 and the opposite end of potentiometer 220.

A clamping transistor 222 has its collector returned to a positive voltage and its emitter coupled to the midpoint of the voltage divider 206, 208 with a capacitor 224, while the base of transistor 222 is connected to the collector of transistor 226 by way of coupling resistor 228, wherein the transistor 226 provides a negative BP (back porch) clamp. As a result, the color burst is enabled at the base of transistor 210, but the chroma information is disabled.

The potentiometer 220 is employed to provide an adjustable chroma phase preset, in particular reference to the color burst. As hereinbefore described, the circuit 52 is adapted to adjust the phase of the color burst in a first direction, while the following stage 54 is adapted to adjust the phase in the opposite direction. Stage 52 provides a preset so that stage 54 can cancel out the effect of stage 52, and/or provide a positive or negative phase shift of the color burst as compared with the color burst of the original input signal. The movable tap of potentiometer 220 is connected to the base of transistor 230 via coupling resistor 232, wherein transistor 230 is connected as a emitter follower and drives the circuit 54. The emitter of transistor 230 is returned to a positive voltage through resistor 234, and is coupled to output burst terminal 236 through capacitors 238 and 240 in series. Potentiometer 56, providing the color burst phase control, is interposed between the midpoint of capacitors 238, 240, and ground, while the movable tap of the potentiometer 56 is returned to ground by means of a linearizing resistor 242. Capacitor 246 couples the movable tap of potentiometer 56 to the base of transistor 248 which is also connected to the midpoint of a voltage divider comprising resistors 250, 252 disposed between the collector of transistor 248 and ground. A resistor 254 connects the collector of transistor 248 to a positive voltage and the emitter of transistor 248 is returned to ground by way of resistor 256.

The phase-shift circuit 54 has the advantage of substantially linear control of the chroma or color burst phase-shift relative to rotation of the control of potentiometer 56. The linearizing resistor 242 is connected between movable tap of the potentiometer and ground in this circuit, whereas such a linearizing resistor could not be positioned at this point should the control potentiometer 56 be located in the emitter circuit of the transistor, for example. Resistor 242 is readily selected in accordance with the value of potentiometer 56 so that a linearizing effect is achieved. In a particular circuit, the value of potentiometer 56 was 2K whereas the value of resistor 242 was 1K, but it is understood that this is only by way of example. It will be understood that burst information is phase-shifted through the transistor 248, with potentiometer 56 being used to adjust desired phase between extremes. The adjusted color burst information from terminal 236 is coupled through capacitor 154 to circuit 32 in FIG. 3. The burst is further enabled by a transistor 258 having its collector grounded, its emitter connected to terminal 236 through capacitor 260, and its base coupled to the negative back porch clamping signal through resistor 262.

Lead 164 from the emitter of transistor 74 in FIG. 3 is further connected to a sync separator circuit 28 through resistor 264 and low pass filter 266, the purpose of which is to remove "snow" or other interference from the video signal. Transistor 268 providing an input active element at the output of the filter drives the sync separator circuit 28 including a capacitor 270 in series with a resistor 272 interposed between the emitter of transistor 268 and the base of transistor 274 forming an output active element. Transistor 274 has its emitter connected to a positive voltage, and its collector returned to ground through resistor 282 as well as being connected to the base of transistor 276. The collector of transistor 276 is connected to the base of transistor 274 while the emitter of transistor 276 is returned to ground through resistor 280. A resistor 286 is interposed between the base of transistor 274 and ground.

Transistor 276 is a positive feedback element or stage that operates during sync pulses. Because of the added feedback stage, the size of capacitor 270 and resistor 284 may be comparatively large and the circuit will still recover from vertical rate tilt, and no "sag" is produced in the signal detected from one line to the next. Consequently, the horizontal sync pulses are consistently detected approximately midrange and the circuit will produce reliable sync information without undue expense and complexity. It is noted that the circuit is desirably driven by a low impedance source, i.e. from the emitter of transistor 268 which is effective in pulling the sync separator out of a saturated condition it achieves during horizontal sync pulses. In the particular embodiment, capacitor 270 had the value of 0.01 microfarads, resistor 272 had a value of 56 ohms, and resistor 284 had a value of 1 megohm, it being understood these values are given by way of example only. The circuit is advantageously employed in the present system wherein a considerable amount of timing information is required to operate the various clamps and DC restoring circuits in accurately predetermined relation to horizontal sync pulses. The collector of transistor of 274 is connected to a narrow-pulse eliminator circuit which includes a diode 286, its cathode being connected to the collector of transistor 274 and its anode being coupled via capacitor 288 to the base of transistor 190. The junction between the diode 286 and capacitor 288 and the junction between the capacitor 288 and the base of transistor 190 are respectively returned to a positive voltage through resistors 290 and 292. When sync pulses occur, the cathode of diode 286 goes positive and the anode of the diode drifts positive as it charges capacitor 288. If the pulse ends early, that is capacitor does not have enough charge on it to trigger the transistor 190, the pulse doesn't operate the circuit. The transistor 190 forms a half-multivibrator that is triggered on the trailing edge of the sync pulse. It will not be triggered unless a sync pulse has been present for a proper length of time. The output of transistor 190 at terminal 294 comprises the positive BP (back porch) clamp which is applied to blanking circuit 46 to remove the burst from the chrominance signal information and to other portions of the circuit as indicated. The clamp pulse output on terminal 294 is also employed to charge up capacitor 296 through diode 298 and resistor 300. The charge on capacitor 296 operates transistor 302 by way of resistor 304 wherein the collector of transistor 302 is connected to the anode of diode 286. Consequently, subsequent to the clamp pulse at 294 being on, a lock-out gate is formed so that after a legitimate sync pulse is detected, the circuit will not accept another input pulse for a significant period of time. Therefore, triggering upon noise is further inhibited. In general, the postive pulse at terminal 294 is used for DC restoration and burst removal, and the negative version of the pulse is used for burst enablement and chroma removal. As will be seen, the terminal 294 is coupled to inverting transistor 226 via resistor 306 for generation of the negative BP clamp at terminal 308.

Referring now to FIG. 5, depicting the output amplifier 36, the input on lead 150 coupled from the luminance level potentiometer 34 is passed through capacitor 310 and resistor 312 to transistor 314 which is part of a compound stage with transistor 362 having its base connected to the collector of transistor 314. The collector of transistor 362 is returned to ground via resistor 320, while the series circuit of a resistor 318 and a capacitor 322 is disposed between the collector and base of transistor 362 for improving high frequency stability. The collector of transistor 362 is connected to the base of an emitter follower transistor 316 having its emitter returned to ground through the series connection of resistors 324 and 326. The center tap between resistors 324 and 326 connects to the emitter of transistor 314. The collector of transistor 314 is connected to a positive voltage through resistor 315. The circuit constants of output stage 36 are chosen to provide a gain of two in the particular embodiment described.

The emitter of transistor 316 is coupled through capacitor 330 and resistor 332 in series to output terminal 38 for the overall circuit. Only one output terminal is shown, but is understood plural output terminals would ordinarily be driven through resistors similar to resistor 332. Also connected to the emitter of transistor 316 is resistor 334 coupling the same to the base of a transistor 344 having its emitter connected to a positive voltage and its collector returned to ground via capacitor 342. A transistor 346 has its base connected to the midpoint of a voltage divider 348, 350 disposed between a positive voltage and ground, and its emitter connected to the emitter of transistor 344 to provide a voltage reference. Resistors 338 and 340 are disposed in series between the collector of transistor 344 and ground, and the midpoint therebetween is connected to the junction between capacitor 310 and resistor 312.

The circuit including transistor 344 comprises a DC restoring circuit for clamping the sync tips of the output at a predetermined voltage, which was 3.4 volts in the specific embodiment. When the output tends to go negative, transistor 344 conducts, thereby charging capacitor 342. Capacitor 342 is coupled to the base of transistor 314 by way of resistor 340 and functions to DC restore the input signal. The charge on the capacitor is bled off by the shunt resistor arrangement including resistors 338 and 340.

Emitter follower transistor 316 provides greater output drive enabling the circuit to drive a plurality of outputs simultaneously. Emitter follower transistor 316 has a fairly high beta at high currents, and the amount of loop gain in the negative feedback circuit including resistor 324 provides an output circuit with very low distortion, e.g. in the case of a color signal. The stage is very stable and the distortion specification does not change with average picture level. Tapping the emitter of transistor 314 on the voltage divider 324, 326 allows the enhancement of the loop gain. In the circuit, the values of resistors 315 and 326 in part establish the loop gain setting.

Figure 6:
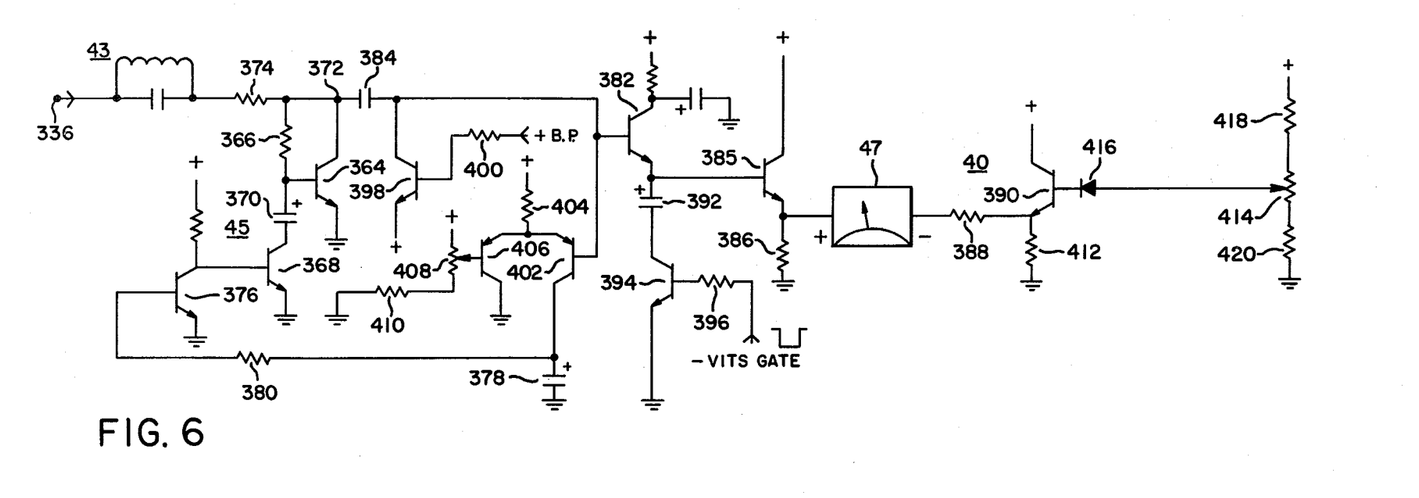
FIG. 6 is a circuit diagram illustrating metering circuitry according to the video processing circuit of the present invention.

Referring now to FIG. 6, illustrating output metering circuitry according to the present invention, terminal 336, corresponding to the similarly numbered terminal in FIG. 5, is coupled to an AGC or automatic gain control circuit by way of chrominance signal trap 43 which is adapted to filter out the chrominance portion of the output signal. The circuit includes a shunt transistor 364 having a resistor 366 positioned between the collector and base thereof, while the emitter of transistor 364 is grounded. The transistor 364 consequently operates as a resistance. A second transistor, numbered 368 has its emitter connected to ground and its collector coupled to the base of transistor 364 by capacitor 370 and functions to control the shunt resistance represented by transistor 364. Consequently, a variable attenuation circuit is positioned between a terminal 372, coupled to the output of filter 43 via resistor 374, and ground. The circuit comprising transistor 368 establishes the attenuation at a comparatively low voltage level, and coupled with transistor 364 provides a controlled resistance capable of operating at a substantial voltage level.

Transistor 368 has its base connected to the collector of amplifying transistor 376, the emitter of which is grounded, and the base of which is coupled across a capacitor 378 by way of resistor 380. It is the level on this capacitor which drives the variable resistance circuit comprising transistors 364 and 368 via amplifying transistor 376. The charge across capacitor 378 is developed in response to the input signal as hereinafter more fully described.

Terminal 372 is coupled to base of peak detector transistor 382 by way of capacitor 384, and transistor 382 in turn drives the base of emitter follower transistor 384. The emitter of transistor 384 is returned to ground through resistor 386, and also provides one terminal for meter 47, the meter being coupled in series with resistor 388 to the emitter of a meter zeroing emitter follower transistor 390. The emitter of transistor 382 is coupled through capacitor 392 to the collector of transistor 394 driven at its base through resistor 396 from the VITS signal as hereinafter more fully described.

The base of transistor 382 is also connected to a clamping circuit comprising transistor 398 having its collector connected to the base of transistor 382, its emitter returned to a reference voltage, and its base coupled to the +BP clamp by way of resistor 400. In the specific embodiment, the transistor 398 clamps the back porch of the video signal at 3.0 volts. Generally, in the specific embodiment, the tips of the horizontal sync pulses extend down to 2.7 volts. The level to which the sync tips extend downwardly below the clamping level at the base of transistor 382 determines operation of the automatic gain control. Capacitor 378 is charged up during the time corresponding to the horizontal sync pulses by way of transistor 402 having its base connected to the base of transistor 382, its collector connected to capacitor 378, and its emitter returned to a positive voltage via resistor 404. Transistor 402 forms a balanced amplifier with a transistor 406, the latter having its emitter connected to the emitter of transistor 402, its collector grounded, and its base connected to the movable tap of a potentiometer disposed between a positive voltage reference and a resistor 410 returned to ground. The potentiometer 408 is a employed as a meter calibrating adjustment. The transistor 402 is turned on to charge capacitor 378 only during the very bottom of the sync tips. The voltage across capacitor 378 is adjusted by means of potentiometer 408 so that the desired level of attenuation is achieved with transistors 364, 368, and a desired level of video signal appears at the base of transistor 382. It will thus be seen that the circuit adjusts to provide a predetermined sync tip level and then the meter will read the general level of the video signal above the back porch clamping level as integrated by means of capacitor 392.

The meter zeroing circuit including transistor 390 is employed to provide a voltage for causing a zero reading of meter 47 for substantially zero luminance, i.e.

when the lens of a video camera is capped or the like. The collector of transistor 390 is connected to a positive voltage, its emitter is returned to ground through resistor 412, and its base is connected to the movable tap of potentiometer 414 by way of diode 416 having its cathode connected to the transistor base. The potentiometer 414 is disposed between a resistor 418 which connects one end of the potentiometer to a positive voltage, and a resistor 420 which connects the opposite end of the potentiometer to ground.

Figure 7:
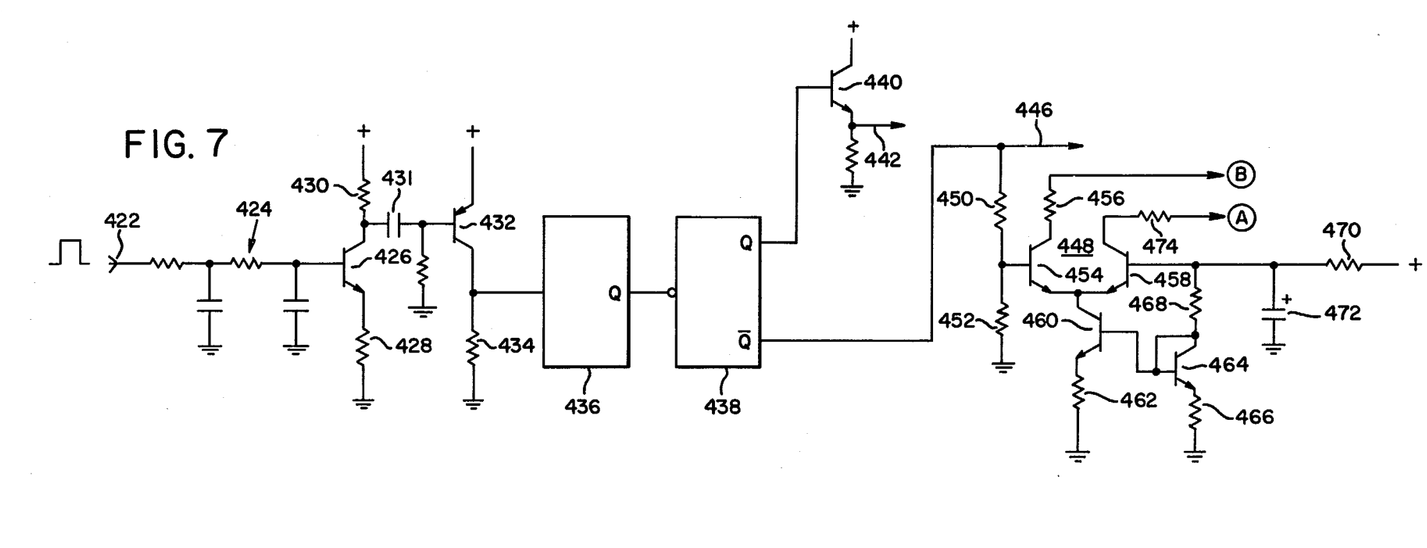
FIG. 7 is a circuit diagram illustrating vertical interval test signal control circuitry according to the present invention.

Referring to FIG. 7, circuitry is illustrated for developing a VITS or vertical interval test signal gate for application in various other parts of the circuitry. The purpose of this VITS circuitry is to let any vertical interval test signals, that might appear on the input, pass through unchanged. Processing by the present circuitry is disabled during the time that VITS might appear. In FIG. 7, the input on lead 422 is derived from sync stripper circuit 28 in FIG. 4, and particularly from the connection between the collector of transistor 274 and the base of transistor 276. This lead is connected to the input of a vertical integrating network 424 in FIG. 7 having its output connected to the base of an amplifier transistor 426, the latter having its emitter returned to ground by resistor 428 and its collector connected to a positive voltage through resistor 430. The amplifier comprising transistor 426 is inverting and consequently a negative going vertical sync pulse appears at the collector of transistor 426 and is coupled via capacitor 431 to the base of transistor 432. The circuitry including transistors 426 and 432 operates as a vertical sync separator and squares up vertical sync pulses supplying an output across resistor 434 interposed between the collector of transistor 432 and ground. The output of transistor 432, which is positive going, triggers one-shot multivibrator 436, the latter comprising one-half of a type 74C221 integrated circuit. The Q output of one-shot multivibrator 436 is coupled to the inverting input of multivibrator 438, the latter also comprising one-half of a type 74C221 integrated circuit. The one-shot multivibrator 436 delays the time between the vertical sync pulse and the start of the area where VITS may be found in the video signal. Then, circuit 438 is triggered to provide a proper width pulse for operating the various VITS gates. The Q output of circuit 438 is applied by way of emitter follower transistor 440 to provide a positive output at 442 used for driving various clamps. For example, one such clamp is located in the chrominance circuit in FIG. 4 and comprises transistor 200 which is driven by way of resistor 444. This same signal is also applied to the base of transistor 226 through resistor 358 from terminal 360 in FIG. 4.

The $\overline{Q}$ output of circuit 438, labeled 446, is applied to circuits requiring a negative VITS gate, e.g. transistor 394 in FIG. 6 for disabling the metering circuit, and also to a circuit 448 for providing a balanced output for driving points A and B in FIG. 3. Lead 446 is connected to one end of a voltage divider comprising resistors 450 and 452 disposed in that order to ground and having the base of transistor 454 connected to the midpoint thereof. The collector of transistor 454 is coupled to terminal B through resistor 456, and the emitter of transistor 454 is connected to the emitter of transistor 458 which forms a balanced amplifier or switched current source with transistor 454. The emitters of the two transistors are connected in common to the collector of current source transistor 460 having its emitter grounded through resistor 462 and its collector connected to diode connected transistor 464 providing a reference. The emitter of transistor 464 is returned to ground via resistor 466 and its collector is connected to a positive voltage by way of resistors 468 and 470 in series. The center tap between resistors 468 and 470 is also connected to the base of transistor 458, and a filter capacitor 472 is disposed between the base of transistor 458 and ground. A resistor 474 connects the collector of transistor 458 to output A.

As will be noted in FIG. 3, terminals A and B are connected respectively to the emitter of transistor 100 and the emitter of transistor 108. During the VITS interval, the current supplied via terminal A will keep the sync separator transistors 100 and 108 turned on. All of the signal including both luminance and synchronizing information will be coupled at this time through the sync separator 98, through resistor 112 and the circuit including transistors 114 and 116 to both sides of potentiometer 34. Thus, during the VITS interval, the overall video signal will be uneffected by luminance processor circuit 32 and consequently the VITS information will pass through without alteration. At other times, the current which is provided at terminal B rather than at terminal A, maintains the same current level through potentiometer 118, for example.

During the VITS interval, the chrominance channel is substantially disabled since the blanking circuit 46 is kept on. The chrominance information is enabled through the color burst phase adjusting channel at this time since a VITS gate signal is applied at terminal 360 so as to continuously enable circuits 52 and 54. The chrominance information is delivered to processor circuit 32 along with burst at capacitor 154 in FIG. 3. Therefore, chrominance adjustment will not interfere with passing of the VITS information.

While I have shown and described preferred embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. A synchronization detecting circuit for use with a video processing circuit, said synchronization detecting circuit comprising:
   an input active element providing a low impedance output,
   an output active element,
   capacitive means coupled from the low impedance output of the input active element to the input of the output active element,
   resistive means coupled between the input of the output active element and a point of reference potential,
   and a positive feedback active element coupling the output of said output active element to the input of said output active element.

2. A synchronization detecting circuit for use with a video processing circuit, said synchronization detecting circuit comprising:
   an input terminal,
   an output transistor,
   a capacitor coupling said input terminal to the base of said output transistor,
   a resistor returning the base of said output transistor to a point of reference potential, and a feedback transistor connected in positive feedback relation to said output transistor, said feedback transistor having its base coupled to the collector of said output transistor and having its collector coupled to the base of said output transistor.

3. The circuit according to claim 2 further including low impedence drive means comprising an input transistor having its emitter coupled to said input terminal.

4. The circuit according to claim 3 further including low pass filter means for receiving a video signal and driving the input transistor wherein said low pass filter means is adapted to pass horizontal synchronizing pulse information from a video signal.

5. The circuit according to claim 4 wherein said low pass filter means comprises an input terminal for said low pass filter means, first and second resistors connected in series between the input terminal of said low pass filter means and the base of said input transistor,
a capacitor returning the midpoint between said first and second resistors to a point of reference potential,
and a capacitor connecting the emitter of said input transistor to the input terminal of said low pass filter means.

6. An output stage for use with a video processing circuit, said output stage comprising:
a compound transistor stage including a first transistor having its collector connected to the base of a second transistor,
an emitter follower transistor having its base connected to the collector of said second transistor,
an output terminal coupled to the emitter of said emitter follower transistor,
a voltage divider comprising first and second resistors connected in series between the emitter of said emitter follower transistor and a point of reference potential,
and means connecting the emitter of said first transistor to the midpoint between said first and second resistors.

7. The circuit of claim 6 further including a capacitor and resistor connected in series between the base and collector of said second transistor.

8. The circuit according to claim 6 further including an output level determining circuit comprising:
a fourth transistor having its base coupled to the emitter of said emitter follower transistor,
a capacitor disposed between the collector of said fourth transistor and a point of reference potential,
and circuit means coupling the collector of said fourth transistor to the base of said first transistor.

9. The circuit according to claim 8 wherein said means coupling the collector of said fourth transistor to the base of said first transistor comprises a voltage divider including a pair of resistors disposed between the collector of said fourth transistor and a point of reference potential,
and a resistor interposed between the junction of the last mentioned pair of resistors and the base of said first transistor,
and means providing a video input to the junction between the last mentioned pair of resistors.

10. The circuit according to claim 9 further including a fifth transistor having its emitter connected to the emitter of said fourth transistor and coupled to a reference potential,
and a voltage divider disposed between points of reference potential and having a junction point connected to the base of said fifth transistor.

* * * * *